US009577524B2

(12) United States Patent
Acharya et al.

(10) Patent No.: US 9,577,524 B2
(45) Date of Patent: Feb. 21, 2017

(54) CONVERTER DEVICE AND CORRESPONDING METHOD

(75) Inventors: Anirudh Acharya, Udupi (IN); Dimitris Giannoccaro, Stockholm (SE); Gopichand Bopparaju, Ludvika (SE); Malaya Kumar Sahu, Bhubaneswar (IN); Soubhik Auddy, Kolkata (IN); Subhasish Mukherjee, Halisahar (IN)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 14/417,270

(22) PCT Filed: Aug. 28, 2012

(86) PCT No.: PCT/EP2012/066685
§ 371 (c)(1),
(2), (4) Date: Jan. 26, 2015

(87) PCT Pub. No.: WO2014/032701
PCT Pub. Date: Mar. 6, 2014

(65) Prior Publication Data
US 2015/0214840 A1 Jul. 30, 2015

(51) Int. Cl.
*H02M 3/158* (2006.01)
*H02J 3/36* (2006.01)
(Continued)

(52) U.S. Cl.
CPC ............... *H02M 3/158* (2013.01); *H02J 3/36* (2013.01); *H02M 1/14* (2013.01); *H02M 7/49* (2013.01);
(Continued)

(58) Field of Classification Search
CPC ............ H02M 2007/4835; H02M 7/49; H02M 5/4585; H02M 1/12; H02M 1/14; H02M 1/44; H02J 3/36; Y02E 60/60
See application file for complete search history.

(56) References Cited

U.S. PATENT DOCUMENTS 6,380,638 B1   4/2002  Bitsche et al.
2002/0024824 A1  2/2002  Reinold
(Continued)

FOREIGN PATENT DOCUMENTS

EP   1 184 963 A2   3/2002
EP   2 341 594 A1   7/2011
(Continued)

OTHER PUBLICATIONS

Jovicic, "Developing DC Transmission Networks Using DC Transformers", IEEE Transactions of Power Delivery, Oct. 2010, vol. 25, No. 4, pp. 2535-2543.

*Primary Examiner* — Adolf Berhane
*Assistant Examiner* — Henry Lee, III
(74) *Attorney, Agent, or Firm* — Birch, Stewart, Kolasch & Birch, LLP

(57) ABSTRACT

It is presented a converter device arranged to convert power between a first high voltage direct current, HVDC, connection, a second HVDC connection and an AC connection. The converter device comprises: a first power converter comprising a phase leg provided between terminals of the first HVDC connection, the phase leg comprising a positive arm, an inductor, an AC connection and a negative arm. Each one of the positive arm and the negative arm comprises converter cells and one of the converter cells is a first host converter cell. Each converter cell comprises two main switching elements and a storage element, the two switching elements being arranged serially in parallel with the energy storage element. The converter device also comprises a power converter section comprising a first converter cell comprising at least two switching elements connected seri- (Continued)

1: converter station
3a, 3b, 3c: phase leg
4: power converter section
9: converter device
10: converter cell of the converter device
11a, 11b: converter cell of the power converter section ally in parallel with the energy storage element of the first host converter cell. The converter device is arranged to control the switching elements of the first switching element string in dependence of the state of the main switching elements of the first host converter cell.

20 Claims, 4 Drawing Sheets

(51) Int. Cl.
      *H02M 7/49*          (2007.01)
      *H02M 1/14*          (2006.01)
      *H02M 7/483*        (2007.01)

(52) U.S. Cl.
      CPC ....... *H02M 2007/4835* (2013.01); *Y02E 60/60* (2013.01)

(56) References Cited

U.S. PATENT DOCUMENTS

| | | |
|---|---|---|
| 2010/0067266 A1 | 3/2010 | Dommaschk et al. |
| 2011/0019442 A1* | 1/2011 | Yamada ................ H02M 1/14 363/44 |
| 2012/0026760 A1* | 2/2012 | Juhlin ...................... H02J 3/36 363/35 |
| 2012/0033462 A1 | 2/2012 | Juhlin |

FOREIGN PATENT DOCUMENTS

| | | |
|---|---|---|
| WO | WO 2009/149742 A1 | 12/2009 |
| WO | WO 2011/060812 A1 | 5/2011 |

\* cited by examiner 1a, 1b, 1c, 1d: converter station 1a, 1b, 1c, 1d: converter station
4: power converter section
9: converter device 1a, 1b, 1c, 1d: converter station
4: power converter section
9: converter device 1a, 1b, 1c, 1d: converter station
4a, 4b: power converter section
9: converter device 1: converter station
3a, 3b, 3c: phase leg
4: power converter section
9: converter device
10: converter cell of the converter device
11a, 11b: converter cell of the power converter section 10: converter cell of the converter device
11a: converter cell of the power converter section
13: filter 10: converter cell of the converter device
11b: converter cell of the power converter section
13: filter 10: converter cell of the converter device
11b: converter cell of the power converter section
13: filter 10: converter cell of the converter device
11a: converter cell of the power converter section
13: filter

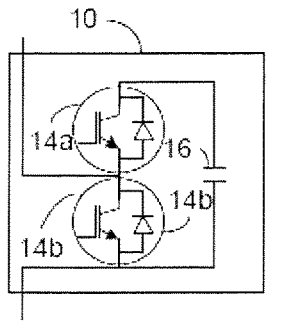
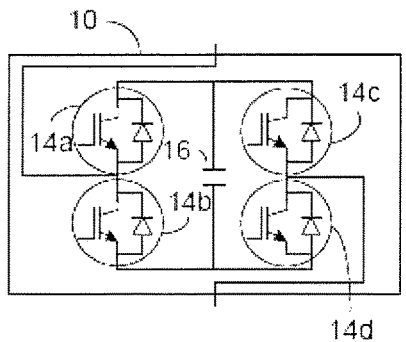
Fig. 5A
Fig. 5B
10: converter cell of the converter device
10: converter cell of the converter device
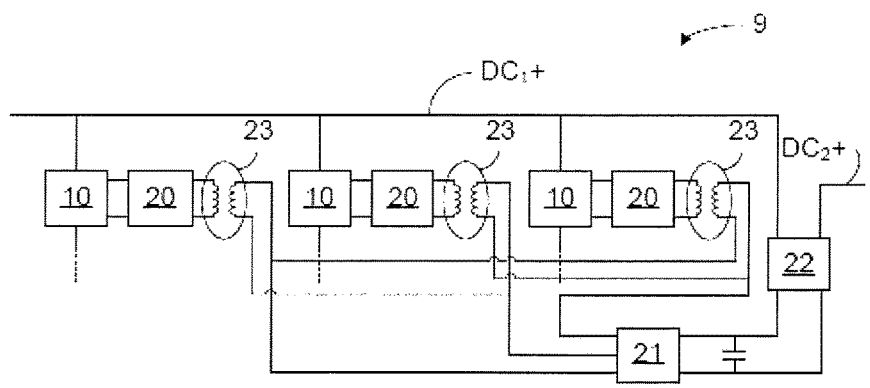
Fig. 6
9: converter device
10: converter cell of the converter device
20: DC/AC converter
21: AC/DC converter
22: polarity changer
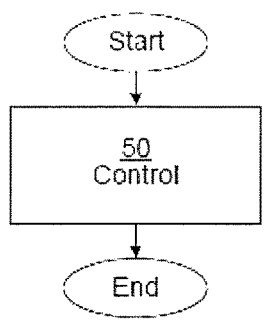
Fig. 7

CONVERTER DEVICE AND CORRESPONDING METHOD

TECHNICAL FIELD

The invention relates to a converter device and corresponding method for converting power between a first high voltage direct current (HVDC) and a second HVDC connection.

BACKGROUND

FIG. 1 shows an environment with two connected High Voltage Direct Current (HVDC) point to point systems. A first HVDC point to point system comprises a first converter station 1a and a second converter station 1b, with a first HVDC link 5a between the first converter station 1a and the second converter station 1b. Similarly, a second HVDC point to point system comprises a third converter station 1c and a fourth converter station 1d, with a second HVDC link 5b between the third converter station 1c and the fourth converter station 1d.

The nominal voltage on the first HVDC link 5a is $V_1$ and the nominal voltage on the second HVDC link 5b is $V_2$. If $V_1$ is equal to $V_2$, or almost equal, the two HVDC links 5a-b can be interconnected with a crosslink 2. In this way, power can flow in either direction between the two HVDC point to point systems.

However, when there is a significant difference between nominal voltage ratings of the two HVDC links, there is a need to convert DC power between the two systems.

It would be beneficial if such conversion could occur with low cost and low complexity.

SUMMARY

It is an object to provide a converter device and method which allows the interconnection of two HVDC systems of different nominal voltages. According to a first aspect, it is presented a converter device arranged to convert power between a first high voltage direct current, HVDC, connection, a second HVDC connection and an alternating current, AC, connection. The converter device comprises: a first power converter comprising at least one phase leg provided between terminals of the first HVDC connection, each one of the at least one phase leg comprising a positive arm, an inductor, an AC connection and a negative arm, arranged serially between the terminals of the first HVDC connection, wherein each one of the positive arm and the negative arm comprises converter cells and one of all the converter cells is a first host converter cell, each converter cell comprising at least two main switching elements and a storage element, two of the at least two switching elements being arranged serially in a converter switching element string, the converter switching element string being connected in parallel with the energy storage element; and a power converter section comprising a first converter cell comprising at least two switching elements, two of the at least two switching elements being connected serially in a first switching element string, the first switching element string being connected in parallel with the energy storage element of the first host converter cell, wherein a point between the two switching elements of the first converter cell is connected to a first terminal of the second HVDC connection wherein the converter device is arranged to control the switching elements of the first switching element string in dependence of the state of the main switching elements of the first host converter cell.

With this converter, the power converter section works in concert with the first host converter cell. In other words, a new, combined, converter cell is formed by using the switching elements of the first host converter cell for an additional conversion in combination with the power converter section. This provides a converter with as few as two additional switching elements.

The power converter section may further comprise a second converter cell comprising at least two switching elements connected serially in a second switching element string, the second switching element string being connected in parallel with the energy storage element of a second host converter cell being one of the converter cells of the phase leg comprising the first host converter cell, wherein a point between the two switching elements of the second converter cell is connected a second terminal of the second HVDC connection, and the first host converter cell and the second host converter cell are provided on either side of the AC connection of the phase leg comprising the first host converter cell and the second host converter cell. Using the second converter cell, a circulating DC current is prevented.

The phrase "directly connected" is to be interpreted in the claims and description herein as having no intermediate components.

The converter device may be arranged to control the switching elements of the first switching element string such that the switching elements of the first switching element string and the main switching elements of the first host converter cell together operate as a full bridge converter cell.

A point between the two switching elements of the converter switching element string may be connected to a terminal of the first HVDC connection.

The first power converter may be an AC/DC converter. The AC/DC can be a unidirectional converter in either direction or a bidirectional converter.

At least part of the converter cells may be half bridge converter cells.

At least part of the converter cells may be full bridge converter cells.

The power converter section may comprise four switching elements arranged in two parallel strings, each comprising two switching elements, wherein both parallel strings are connected in parallel with the energy storage element of the first host converter cell.

The converter device may further comprise a filter connected to the power converter section arranged to reduce any ripple on the second HVDC connection.

The power converter section form part of a DC to DC converter.

The first power converter may comprise three phase legs for providing a three phase AC connection.

The power converter section may comprise, a DC/AC converter and a transformer for each phase, and an AC/DC converter connected between the transformers and the second HVDC connection.

The power converter section may further comprise a polarity changer provided between the AC/DC converter and the second HVDC connection.

According to a second aspect it is presented a method for converting power between a first high voltage direct current, HVDC, connection, a second HVDC connection and an alternating current, AC, connection using a converter device comprising: a first power converter comprising at least one phase leg provided between terminals of the first HVDC connection, each one of the at least one phase leg comprising a positive arm, an inductor, an AC connection and a negative arm, arranged serially between the terminals of the first HVDC connection, wherein each one of the positive arm and the negative arm comprises converter cells and one of all the converter cells is a first host converter cell, each converter cell comprising at least two main switching elements and a storage element, two of the at least two switching elements being arranged serially in a converter switching element string, the converter switching element string being connected in parallel with the energy storage element; and a power converter section comprising a first converter cell comprising at least two switching elements, two of the at least two switching elements being connected serially in a first switching element string, the first switching element string being connected in parallel with the energy storage element of the first host converter cell, wherein a point between the two switching elements of the first converter cell is connected to a first terminal of the second HVDC connection. The method comprises the step of controlling the power converter section to inject a controllable DC voltage to align the voltages of the first HVDC connection and the second HVDC connection in dependence of the state of the main switching elements of the first host converter cell.

The step of controlling may comprise controlling switching elements of the power converter section to achieve a desired voltage and polarity between the first HVDC connection and the second HVDC connection.

The step of controlling may comprise controlling the switching elements of the first switching element string such that the switching elements of the first switching element string and the main switching elements of the first host converter cell together operate as a full bridge converter cell.

Any feature or the first or the second aspects may, where appropriate, be applied to the other one of these aspects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 5A-B show two embodiments of converter cells of the converter device of FIGS. 3 and 6;

FIG. 6 shows one embodiment of a converter device of FIGS. 2A-C; and

FIG. 7 is a flow chart illustrating a method performed in the converter device of FIGS. 2A-C.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
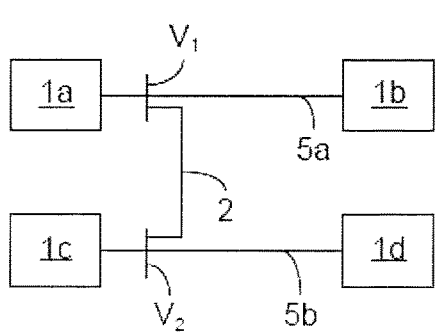
FIG. 1 shows an environment with two connected HVDC point to point systems.

FIG. 1 shows an environment with two connected HVDC point to point systems which is described in the background section.

Figure 2A:
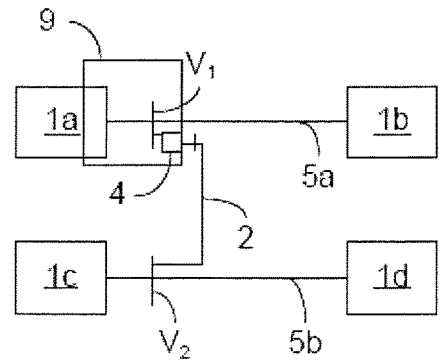
FIGS. 2A-C show various embodiments of interconnecting two connected HVDC point to point systems.
Figure 2B:
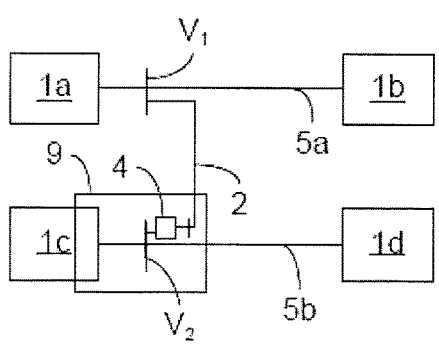
Figure 2C:
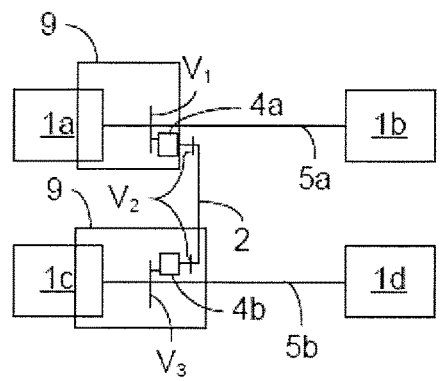

FIGS. 2A-C show various embodiments of interconnecting two connected HVDC point to point systems. In the embodiment shown in FIG. 2A, a converter device 9 is provided, comprising a first power converter, of the first converter station 1$a$, and a power converter section 4. In this way, the voltage on the crosslink 2 is controlled to be $V_2$, enabling the connection between the two connected HVDC point to point systems even when there is a significant difference in voltage.

The converter device 9 can be provided in different locations. In the embodiment shown in FIG. 2B, the converter device 9 is provided connected to the third converter station 1$c$ of the second HVDC point to point system. In the embodiment shown in FIG. 2C, two converter devices 9 are provided at the first and third converter stations 1$a$, 1$c$, of the first and second HVDC point to point systems, respectively.

Figure 3:
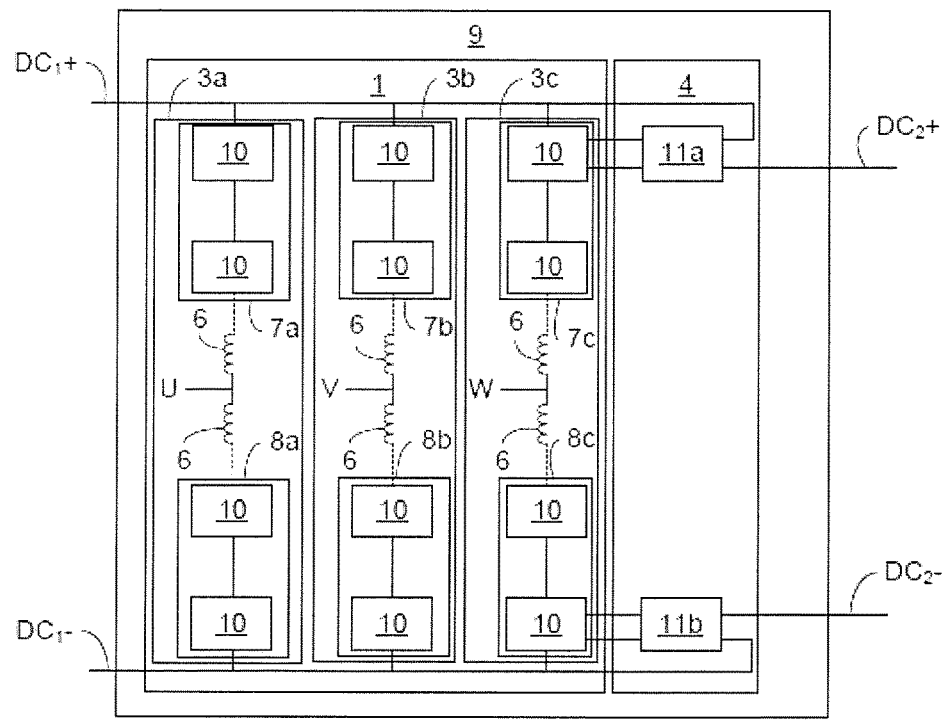
FIG. 3 shows an embodiment of a converter device of FIGS. 2A-C.

FIG. 3 shows an embodiment of a converter device 9 of FIGS. 2A-C. The converter device 9 is arranged to convert power between a first HVDC connection $DC_1$, a second HVDC connection $DC_2$ and an AC (alternating current) connection U, V, W. The first HVDC connection $DC_1$ can e.g. be connected to the first HVDC link 5$a$ of FIGS. 2A-C and the second HVDC connection $DC_2$ can e.g. be connected to the second HVDC link 5$b$ of FIGS. 2A-C, or vice versa.

The converter device 9 comprises a first power converter 1 and a power converter section 4.

The first power converter comprises three phase legs 3$a$-$c$ provided between terminals $DC_1$+, $DC_1$- of the first HVDC connection $DC_1$. While three phase legs 3$a$-$c$ are shown in FIG. 3, any number of phase legs can be provided. Each one of the phase legs 3$a$-$c$ comprises a positive arm 7$a$-$c$, an inductor 6, an AC connection U, V, W and a negative arm 8$a$-$c$, arranged serially between the terminals $DC_1$+, $DC_1$- of the first HVDC connection $DC_1$. Optionally, the inductor 6 is divided in two sections on either part of the respective AC connection U, V, W. Each one of the positive arms 7$a$-$c$ and the negative arms 8$a$-$c$ comprises a plurality of converter cells 10.

The converter cells 10 are controlled to convert power from the first DC connection $DC_1$ to the three phase AC connection U, V, W, or vice versa.

The power converter section 4 is connected on one side to terminals $DC_2$+, $DC_2$- of the second HVDC connection $DC_2$. On the other side, a positive converter cell 11$a$ of the power converter section 4 is connected to the converter cell 10 of a positive arm 7$c$ which is also connected to the positive terminal $DC_1$+ of the first HVDC connection. Moreover a negative converter cell 11$b$ of the power converter section 4 is connected to the converter cell 10 of a negative arm 8$c$ which is also connected to the negative terminal $DC_1$- of the first HVDC connection. The negative converter cell 11$b$ is there to, in concert with the positive converter cell 11$a$, prevent a DC circulating current from flowing into the ac line.

Each one of the converter cells 10, 11a-b of the two power converters 1, 4 comprises switching elements (see FIGS. 4A-D, 5A-B). The switching elements can for example be implemented using an insulated gate bipolar transistor (IGBT), Integrated Gate-Commutated Thyristor (IGCT), a Gate Turn-Off thyristor (GTO), or any other suitable high power semiconductor component. Moreover, at least the converter cells 10 of the first power converter 1 each comprises an energy storage element (see 4A-C, 5A-B). The energy storage element can e.g. be implemented using a capacitor, a super capacitor, an inductor, a battery, etc.

Using the power converter section 4, unidirectional or bidirectional power transfer can occur between the first HVDC connection $DC_1$ and the second HVDC connection $DC_2$. Also, conversion can also occur to and/or from the AC connection U, V, W. The first HVDC connection $DC_1$ can have a voltage which is higher than the second HVDC connection $DC_2$ or vice versa. Using this solution, a flexibility is achieved in connecting two converter stations, which may be part of a bigger network or dc grid, whose nominal DC voltage ratings are widely different.

The power converter section 4 of FIG. 3 injects a controllable positive or negative DC voltage in series with the DC line to align the two station voltages. An advantage with the embodiments shown is that it involves only minor modifications to existing systems. The first power converter 1 typically is an existing converter station, whereby only the components of the power converter section 4 need to be added.

The converter device 4 can be used in point to point systems as shown in FIG. 2A-C, or in multipoint systems, whenever there is a need for voltage conversion between connected HVDC systems.

It is realised that the presented embodiment creates an uneven load on the cells of other phase legs 3a-b. The unbalance may causes a circulating DC current. However, the circulating current is very low. For example, for a converter device 9 of 1200 MW having 36 cells per arm and where $DC_1$ is 640 kV and $DC_2$ is 656 kV (16 kV is increased by adding 8 kV on either pole), the circulating current DC in the connected phase leg 3c is only about 30 A, (15 A+15 A, from other two phases).

FIG. 4A-D show details of the converter device 4 of FIG. 3 in various embodiments.

Figure 4A:
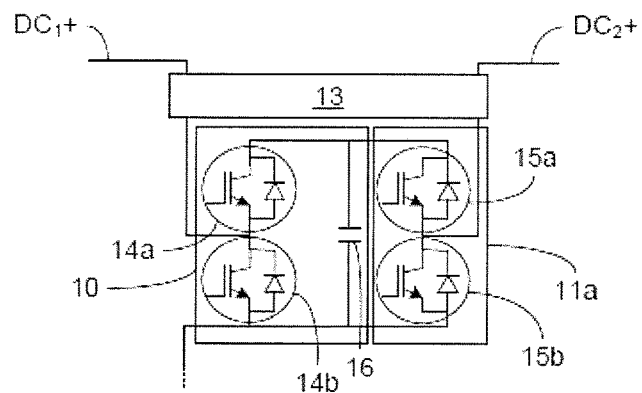
FIG. 4A-D show details of the converter device of FIG. 3 in various embodiments.

In the embodiment shown in FIG. 4A, the positive converter cell 11a of the power converter section 4 is shown connected to the first host converter cell 10, of a positive arm 7c, which is also connected to the positive terminal $DC_1^+$ of the first HVDC connection. In other words, the first host converter cell 10 shown in FIG. 4A is the topmost converter cell 10 shown in the third positive arm 7c of FIG. 3.

The first host converter cell 10 of the positive arm 7c is in this example a half bridge converter cell and comprises two switching elements 14a-b connected in a converter switching element string in parallel with an energy storage element 16. It is to be noted that the first host converter cell 10 could also be a full bridge converter cell. The positive converter cell 11a also comprises two switching elements 15a-b, arranged serially in a switching element string.

The switching element string of the positive converter cell 11a is connected in parallel with the energy storage element 16 of the converter cell 10 of the positive arm. The output of the positive converter cell 11a is connected to a point between the two switching elements 15a-b of the switching element string. The output is connected via a filter 13 to the positive terminal $DC_2^+$ of the second HVDC connection $DC_2$. The filter 13 reduces ripple on the second HVDC connection $DC_2$. The filter can e.g. be an appropriately dimensioned LC filter.

The power converter section 4 should able to produce an output voltage of both polarities, so that it can be used for both increasing and decreasing the net DC bus voltage of the first HVDC connection $DC_1$. In FIG. 4A, this is achieved by first host converter cell 10 of the positive arm being utilised to be part of a full bridge converter, whereby only the two switching elements 15a-b of the positive converter cell 11a need to be added. The energy storage element 16 of the original first host converter cell 10 also becomes part of the resulting full bridge converter. The first host converter cell 10 of the positive arm 7c and the positive converter cell 11a can be separate, interconnected, devices or can optionally be combined in one physical device. Being a full bridge converter, the resulting voltage at terminal $DC_1^+$ and $DC_2^+$ is capable of assuming both signs, whereby the output voltage of the full bridge converter cell can either be zero, the voltage of the energy storage component 16, or a reversed voltage of the energy storage component 16.

During operation, the power converter section should avoid having significant negative effect on the normal operation of the first power converter. Thus, the operation of power converter section is governed by the operation of the first host converter cell 10. It means that, for positive average voltage contribution to $DC_2^+$, the positive cell 11a can operate when the first switching element 14a conducts. When the second switching element 14b conducts, the positive cell 11a remains inoperative or bypassed. To get a variable DC contribution voltage to $DC_2^+$, the duration of when the second switching element 15b of the positive cell 11a is in a conductive state can be varied, i.e. the duty cycle.

Analogously, to get negative average contribution to $DC_2^+$, the positive cell operate only when the second switching element 14b conducts. To get a variable DC contribution voltage to $DC_2^+$, the duration of when the first switching element 15a of the positive cell can be varied.

The operation of the positive converter cell can be summarized in tables given below, where '1' indicates a conducting state and '0' indicates a blocking state.

To get a positive voltage contribution to $DC_2^+$, the switching pattern is shown in Table 1 where $V_c$ is the voltage of the energy storage element 16:

TABLE 1

Switching pattern for positive contribution

| $DC_2^+ - DC_1^+$ | First converter cell switching element 14a | Second converter cell switching element 14b | First positive cell switching element 15a | Second positive cell switching element 15b |
|---|---|---|---|---|
| 0 | 0 | 1 | 0 | 1 |
| Vc | 0 | 1 | 1 | 0 |
| Bypassing | 1 | 0 | 1 | 0 |

The term bypassing refers to a state where the voltage contribution to the $DC_2+$ and $DC_1+$ is zero. The term Bypassing is used instead of zero because during this period the power converter section cannot operate to contribute the desired output voltage. Only zero output and $-Vc$ is possible during this period.

To get a negative voltage contribution to $DC_2^+$, the switching pattern is shown in Table 2:

TABLE 2

Switching pattern for positive contribution

| $DC_2^+$-$DC_1^+$ | First converter cell switching element 14a | Second converter cell switching element 14b | First positive cell switching element 15a | Second positive cell switching element 15b |
|---|---|---|---|---|
| 0 | 1 | 0 | 1 | 0 |
| -Vc | 1 | 0 | 0 | 1 |
| Bypassing | 0 | 1 | 0 | 1 |

In Table 2, bypassing also refers to a state where the voltage contribution to the $DC_2$+ and $DC_1$+ is zero. The term Bypassing is used instead of zero because during this period the power converter section cannot operate to contribute the desired output voltage. Only zero output and Vc is possible during this period.

Figure 4B:
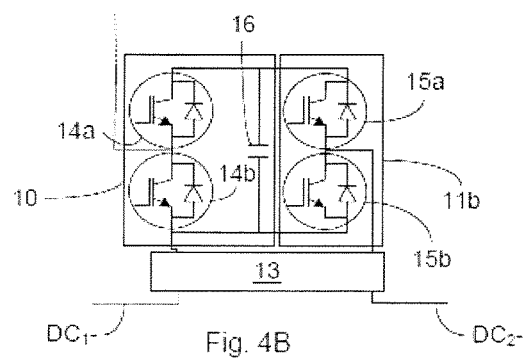

In the embodiment shown in FIG. 4B, the negative converter cell 11b of the power converter section is shown connected to the second host converter cell 10, of the negative arm 8c, which is also connected to the negative terminal $DC_1$- of the first HVDC connection. In other words, the second host converter cell 10 shown in FIG. 4B is the lowermost converter cell 10 shown in the third negative arm 8c of FIG. 3.

The connection to the negative terminal $DC_1$- of the first HVDC connection stems from the negative terminal of the energy storage element 16, whereas the connection to negative terminal $DC_2$- stems from a point between the two switching elements 15a-b. Unlike the embodiment shown in FIG. 4A, the output voltage of the negative converter cell 11b at terminal $DC_1$- and $DC_2$- is unipolar. That is, it can contribute zero voltage and the voltage of the energy storage component 16 to $DC_2$-. The converter cell adds zero voltage to $DC_2$- when the second positive cell switching element 15b is conducting. The converter cell adds the voltage of the energy storage component 16 to $DC_2$- when the first positive cell switching element 15a is conducting. The switching operation of this converter cell is summarised in Table 3 as follows:

TABLE 3

Switching pattern of the negative cell 11b of FIG. 4B

| $DC_2^-$-$DC_1^-$ | First positive cell switching element 15a | Second positive cell switching element 15b |
|---|---|---|
| 0 | 0 | 1 |
| Vc | 1 | 0 |

Thus in the embodiment shown in FIG. 4B, the switching operation of the 15a-b is independent of the switching operation of 14a-b.

Figure 4C:
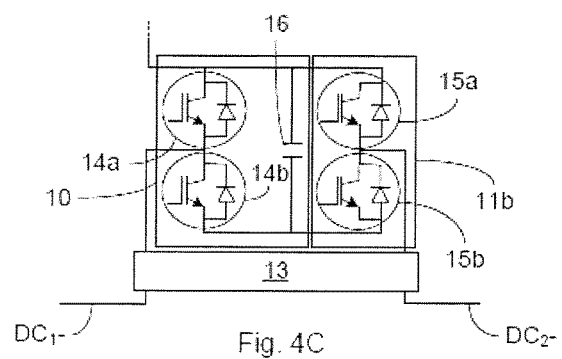
Figure 4D:
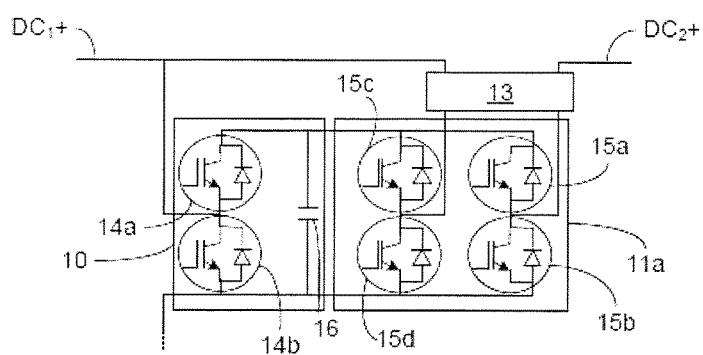

In the embodiment shown in FIG. 4C, as in the embodiment of FIG. 4B, the negative converter cell 11b of the power converter section is shown connected to the second host converter cell 10, of the negative arm 8c, which is also connected to the negative terminal $DC_1$- of the first HVDC connection. In other words, the second host converter cell 10 shown in FIG. 4B is the lowermost converter cell 10 shown in the third negative arm 8c of FIG. 3.

In this embodiment, the connection to the negative terminal $DC_1$- of the first HVDC connection stems from a point between the two switching elements 14a-b. If this embodiment is combined with the embodiment of FIG. 4A, a symmetry from the perspective of the positive and negative terminals $DC_1^+$, $DC_1^-$ of the first HVDC connection is achieved. In this way, the converter cell of FIG. 4B is of an equivalent configuration to the converter cell of FIG. 4A, effectively implementing a full bridge converter cell.

The switching of the switching elements shown in FIG. 4C is controlled according to the same principle as is described above with reference to FIG. 4A FIG. 4D shows an embodiment which is an extension to the embodiment shown in FIG. 4A. In this embodiment, the positive cell 11a comprises two additional switching elements 15c-d in a parallel leg to the two original switching elements 15a-b. The midpoints of the two parallel legs of the positive cell 11a are connected to the positive terminals $DC_1^+$, $DC_2^+$ of the first and second HVDC connections, respectively, via a filter 13.

The additional switching elements 15c-d are controlled in the same way as the switching elements 14a-b of the first host converter cell 10, whereby current capacity is increased.

FIG. 5A-B show two embodiments of converter cells 10 of the converter device of FIG. 3. FIG. 5A illustrates a converter cell 10 implementing a half bridge structure. The converter cell 10 here comprises a leg of two serially connected active components in the form of switching elements 14a-b, e.g. IGBTs, IGCTs, GTOs, force commutated thyristors, etc. Each of the switching elements 14a-b includes an antiparallel diode. An energy storage component 16 is also provided in parallel with the leg of transistors 14a-b. The output voltage synthesized by the converter cell can thus either be zero or the voltage of the energy storage component 16.

FIG. 5B illustrates a converter cell 10 implementing a full bridge structure. The converter cell 10 here comprises four switching elements 14a-d, e.g. IGBTs, IGCTs, GTOs, etc. An energy storage component 16 is also provided in parallel across a first leg of two transistors 14a-b and a second leg of two transistors 14c-d. Compared to the half bridge of FIG. 9B, the full bridge structure allows the synthesis of an output voltage capable of assuming both signs, whereby the voltage of the converter cell can either be zero, the voltage of the energy storage component 16, or a reversed voltage of the energy storage component 16.

FIG. 6 shows one embodiment of a converter device 9 of FIGS. 2A-C. The converter device 9 in this example is similar to the converter device of FIG. 3, but here connects to converter cells of all three phase legs. Here, there is a DC/AC converter 20 connected to one of the converter cells 10. In this embodiment, the converter cell 10 can be any one of the converter cell, not just the uppermost or lowermost converter cell. Each one of the respective DC/AC converters is connected to a respective transformer 23 or a combined three-phase transformer (e.g. open delta or open star). One purpose of the transformer is to prevent a short circuit between the converter cells of the phase legs.

A three-phase AC/DC converter 21 is connected to the three transformers 23. On the other side of the three phase AC/DC converter 21, a polarity changer 22 is provided which reverses the polarity for the second HVDC connection $DC_2$.

FIG. 7 is a flow chart illustrating a method performed in the converter device 9 of FIGS. 2A-C. The method is performed in the converter device of FIG. 3 or FIG. 6. The method comprises the step of controlling 50 the power converter section to inject a positive or negative controllable DC voltage to align the voltages of the first HVDC connection (DC$_1$) and the second HVDC (DC$_2$).

The step of controlling 50 comprises controlling the at least two switching elements 15*a*-*d* of the power converter section in dependence of the state (either conducting or blocking) of the main switching elements of the connected host converter cell, e.g. as described above with reference to FIG. 4A in Tables 1-2.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A converter device arranged to convert power between a first high voltage direct current, HVDC, connection, a second HVDC connection and an alternating current, AC, connection the converter device comprising:
   a first power converter comprising at least one phase leg provided between terminals of the first HVDC connection, each one of the at least one phase leg comprising a positive arm, an inductor, an AC connection and a negative arm, arranged serially between the terminals of the first HVDC connection, wherein each one of the positive atm and the negative arm comprises converter cells and one of all the converter cells is a first host converter cell, each one of the converter cells of the positive arm and of the negative arm comprising at least two main switching elements and a storage element, two of the at least two main switching elements being arranged serially in a converter switching element string, the converter switching element string being connected in parallel with the energy storage element; and
   a power converter section comprising a first converter cell comprising at least two switching elements, two of the at least two switching elements of the first converter cell of the power converter section being connected serially in a first switching element string, the first switching element string being connected in parallel with the energy storage element of the first host converter cell, wherein a point between the two of the at least two switching elements of the first converter cell is connected to a first terminal of the second HVDC connection, and the first converter cell is different from the first host converter cell;
   wherein the converter device is arranged to control the at least two switching elements of the first switching element string in dependence of a state of the at least two main switching elements of the first host converter cell.

2. The converter device according to claim 1, wherein the power converter section further comprises a second converter cell comprising at least two switching elements connected serially in a second switching element string, the second switching element string being connected in parallel with the energy storage element of a second host converter cell being one of the converter cells of the at least one phase leg comprising the first host converter cell, wherein a point between the two of the at least two switching elements of the second converter cell is connected a second terminal of the second HVDC connection, and the first host converter cell and the second host converter cell are provided on either side of the AC connection of the at least one phase leg comprising the first host converter cell and the second host converter cell.

3. The converter device according to claim 1, wherein the converter device is arranged to control the at least two switching elements of the first switching element string such that the at least two switching elements of the first switching element string and the at least two main switching elements of the first host converter cell together operate as a full bridge converter cell.

4. The converter device according to claim 1, wherein a point between the two of the at least two switching elements of the converter switching element string is connected to one of the terminals of the first HVDC connection.

5. The converter device according to claim 1, wherein the first power converter is an AC/DC converter.

6. The converter device according to claim 1, wherein at least part of the converter cells are half bridge converter cells.

7. The converter device according to claim 1, wherein at least part of the converter cells are full bridge converter cells.

8. The converter device according to claim 1, wherein the power converter section comprises four switching elements arranged in two parallel strings, each comprising two switching elements, wherein both parallel strings are connected in parallel with the energy storage element of the first host converter cell.

9. The converter device according to claim 1, further comprising a filter connected to the power converter section arranged to reduce any ripple on the second HVDC connection.

10. The converter device according to claim 1, wherein the power converter section forms part of a DC, direct current, to DC converter.

11. The converter device according to claim 1, wherein the first power converter comprises three phase legs for providing a three phase AC connection.

12. A method for converting power between a first high voltage direct current, HVDC, connection, a second HVDC connection and an alternating current, AC, connection using a converter device comprising: a first power converter comprising at least one phase leg provided between terminals of the first HVDC connection, each one of the at least one phase leg comprising a positive arm, an inductor, an AC connection and a negative arm, arranged serially between the terminals of the first HVDC connection, wherein each one of the positive arm and the negative arm comprises converter cells and one of all the converter cells is a first host converter cell, each one of the converter cells of the positive arm and of the negative arm comprising at least two main switching elements and a storage element, two of the at least two main switching elements being arranged serially in a converter switching element string, the converter switching element string being connected in parallel with the energy storage element; and a power converter section comprising a first converter cell comprising at least two switching elements, two of the at least two switching elements of the first converter cell of the power converter section being connected serially in a first switching element string, the first switching element string being connected in parallel with the energy storage element of the first host converter cell, wherein a point between the two of the at least two switching elements of the first converter cell is connected to a first terminal of the second HVDC connection, and the first converter cell is different from the first host converter cell, the method comprising the step of controlling the power converter section to inject a controllable DC voltage to align a voltage of the first HVDC connection and a voltage of the second HVDC connection in dependence of a state of the at least two main switching elements of the first host converter cell.

13. The method according to claim 12, wherein the step of controlling comprises controlling the at least two switching elements of the power converter section to achieve a desired voltage and polarity between the first HVDC connection and the second HVDC connection.

14. The method according to claim 12, wherein the step of controlling comprises controlling the at least two switching elements of the first switching element string such that the at least two switching elements of the first switching element string and the at least two main switching elements of the first host converter cell together operate as a full bridge converter cell.

15. The converter device according to claim 2, wherein the converter device is arranged to control the at least two switching elements of the first switching element string such that the at least two switching elements of the first switching element string and the at least two main switching elements of the first host converter cell together operate as a full bridge converter cell.

16. The converter device according to claim 2, wherein a point between the two of the at least two switching elements of the converter switching element string is connected to one of the terminals of the first HVDC connection.

17. The converter device according to claim 3, wherein a point between the two of the at least two switching elements of the converter switching element string is connected to one of the terminals of the first HVDC connection.

18. The converter device according to claim 2, wherein the first power converter is an AC/DC converter.

19. The converter device according to claim 3, wherein the first power converter is an AC/DC converter.

20. The converter device according to claim 4, wherein the first power converter is an AC/DC converter.

* * * * *